UNITED STATES PATENT OFFICE.

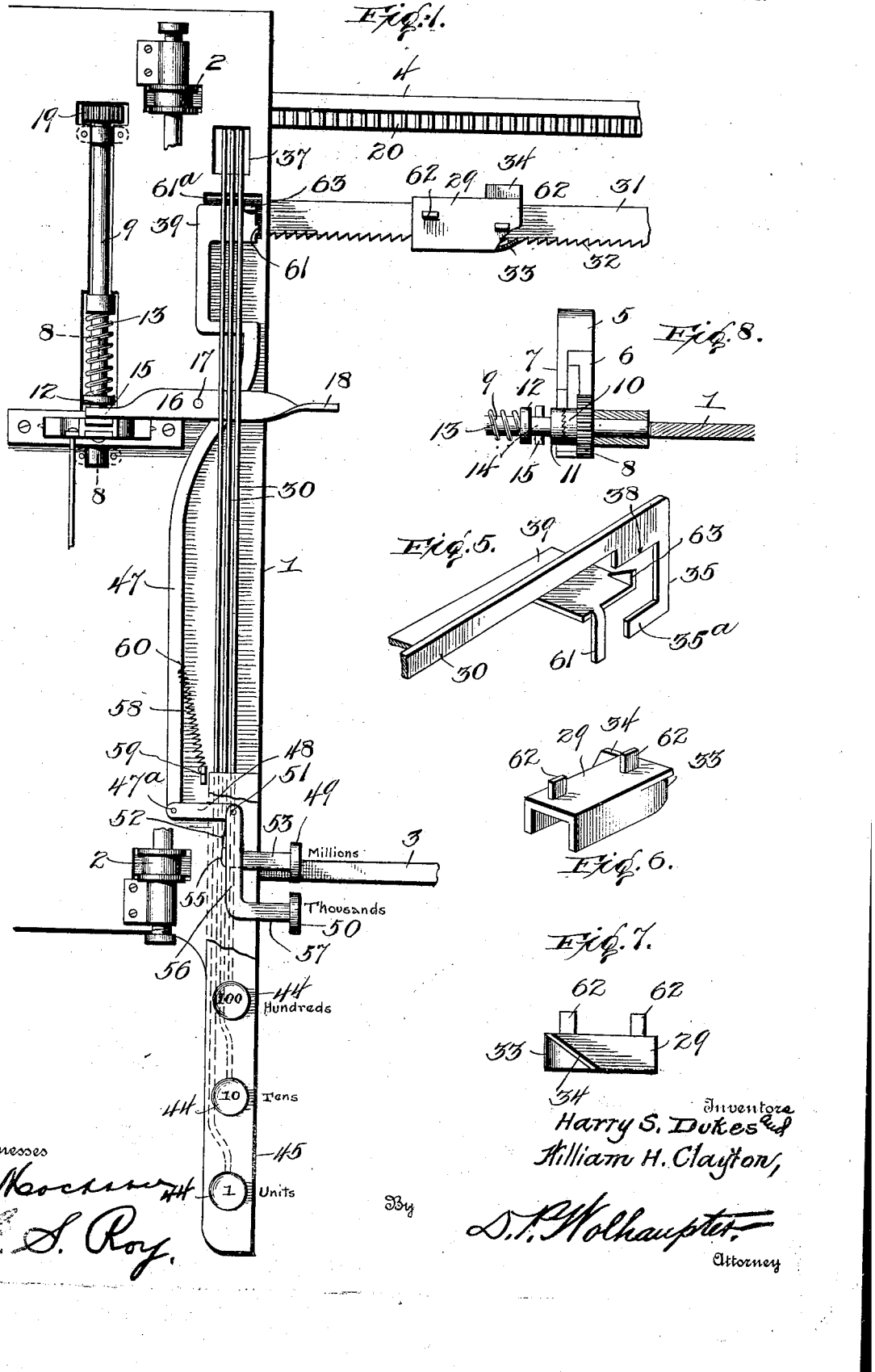

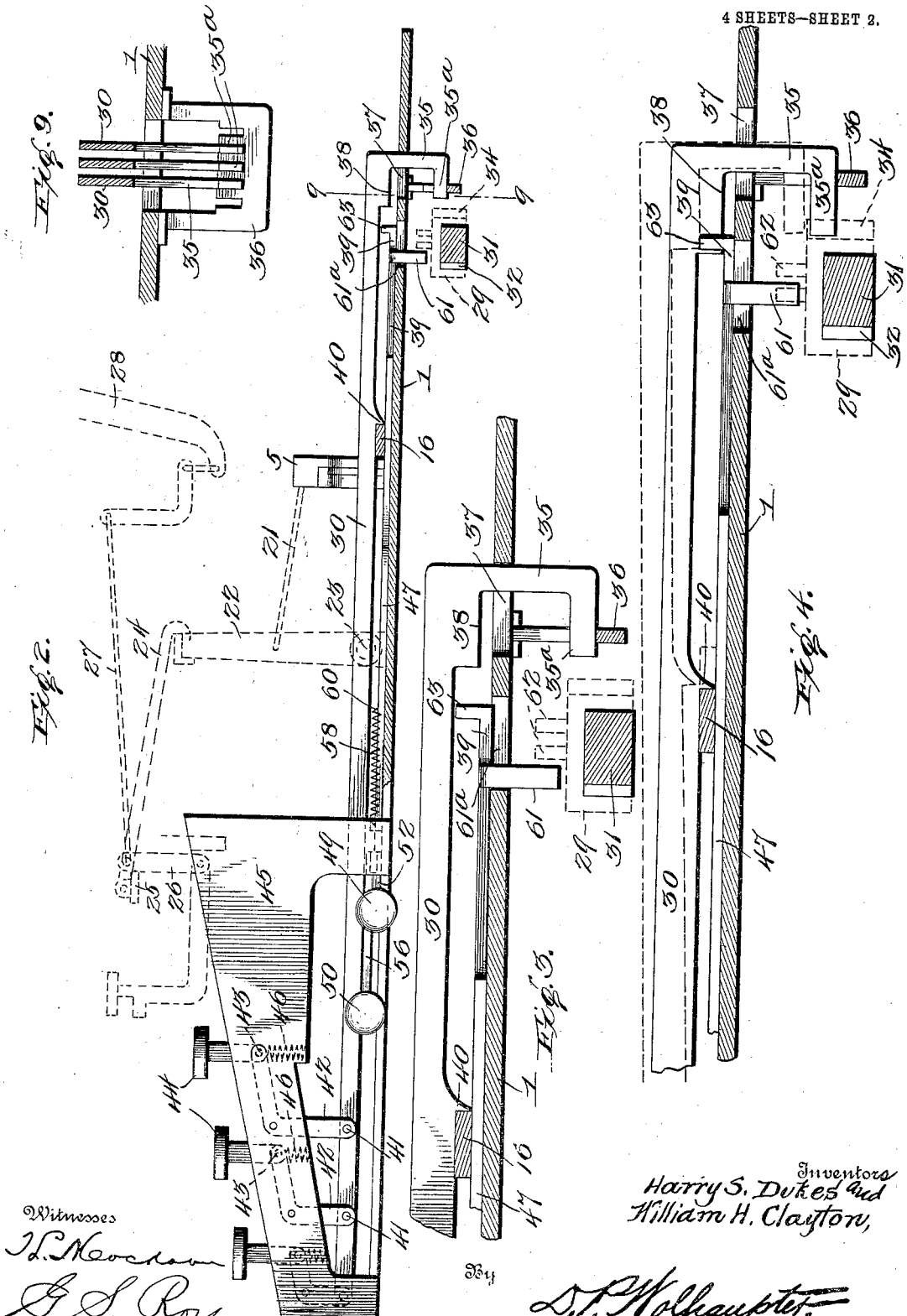

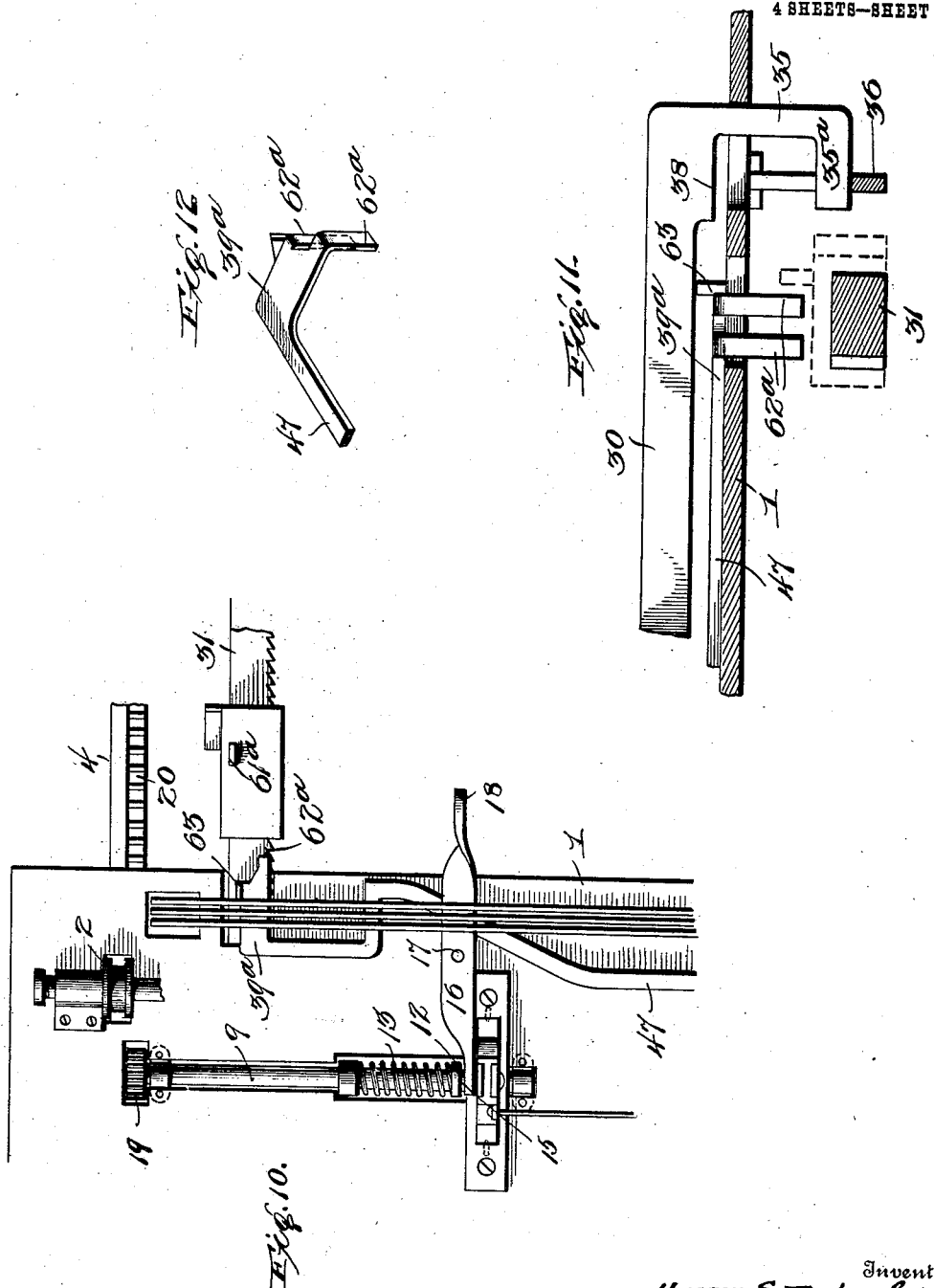

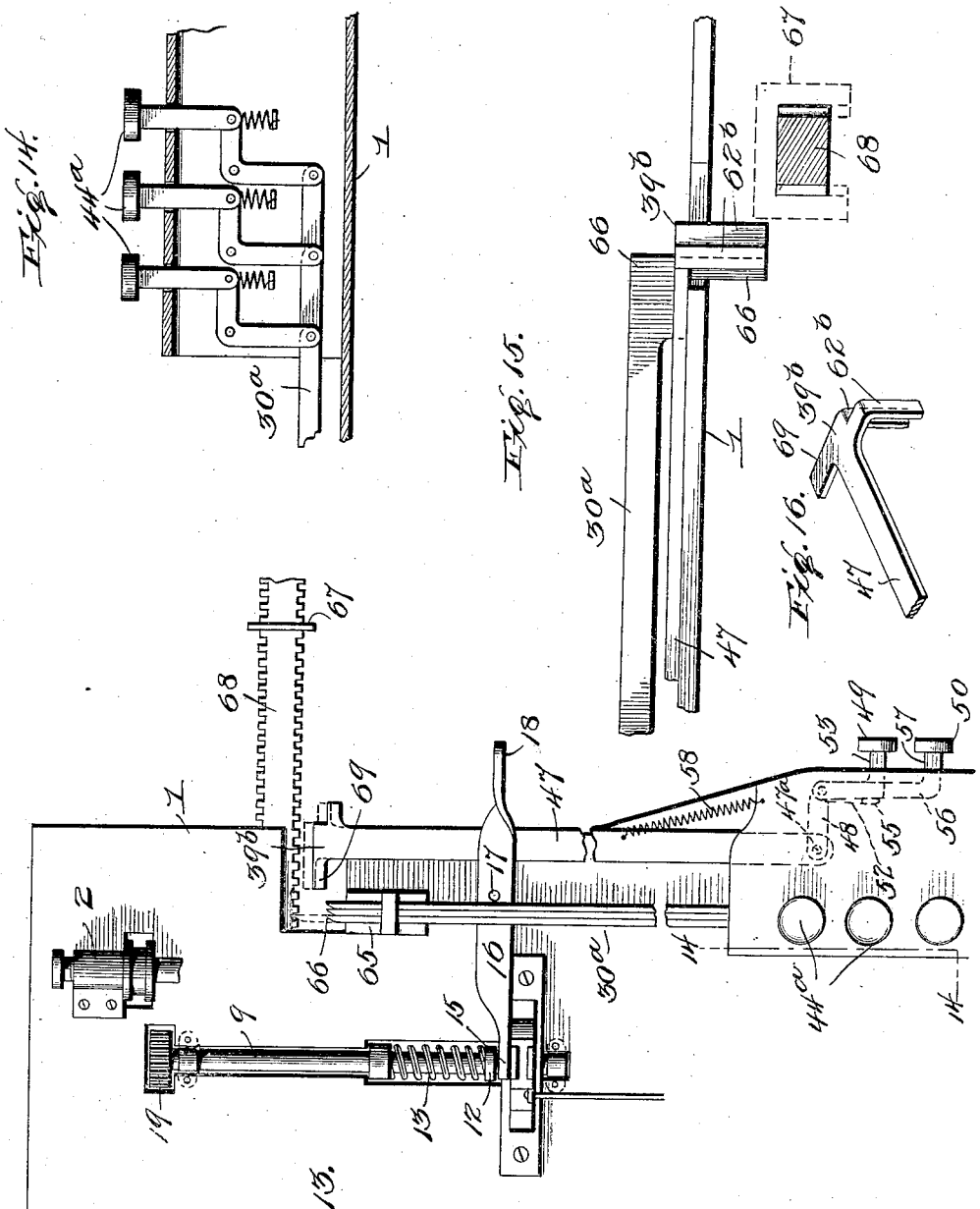

HARRY S. DUKES AND WILLIAM H. CLAYTON, OF LITTLE ROCK, ARKANSAS.

TABULATING MECHANISM FOR TYPE-WRITING MACHINES.

No. 908,221.

Specification of Letters Patent.

Patented Dec. 29, 1908.

Application filed July 10, 1903. Serial No. 164,993.

*To all whom it may concern:*

Be it known that we, HARRY S. DUKES and WILLIAM H. CLAYTON, citizens of the United States, residing at Little Rock, in the county of Pulaski and State of Arkansas, have invented certain new and useful Improvements in Tabulating Mechanism for Type-Writing Machines, of which the following is a specification.

This invention relates to an improved tabulating mechanism for typewriting machines, and has in view a simple and practical construction permitting the work of tabulating to be easily and expeditiously effected, with a minimum number of denominational keys or selectors.

To this end the invention primarily contemplates an auxiliary for tabulating mechanisms which reduces the number of denominational keys or selectors to correspond to the number of factors in each denominational group, whereby each tabulating key or denominational element is made to have a range of action for checking the carriage at variable distances from a column locating or predetermined point.

In other words, the invention has for its general object the provision of a denominational amplifier or amplifying device, coöperating with the elements of the tabulating mechanism and serving to amplify the spacing value, or denominational range, of each tabulating selector or denominational element.

Another object of the invention is to provide a denominational amplifier or amplifying device susceptible of embodiment in any type of tabulating mechanism employing a column locating element, and a plurality of denominational elements coöperating therewith and usually representing only one space or spacing value in the column of matter.

With these and many other objects in view, which will more readily appear as the nature of the invention is better understood, the same consists in the novel construction, combination and arrangement of parts as will be hereinafter more fully described, illustrated, and claimed.

The essential feature of the invention, as above indicated, is susceptible of a wide range of modification according to the type of tabulating mechanism, or character of typewriting machine, with which it may be associated, but for illustrative purposes several practical adaptations or embodiments of the invention are shown in the accompanying drawings, in which—

Figure 1 is a skeletonized plan view of a portion of a book typewriting machine showing the invention applied to the tripping form of tabulating mechanism disclosed in our pending application, Serial Number 142,278, filed February 7, 1903. Fig. 2 is a skeletonized sectional view of the same construction, illustrating in dotted lines the type action which coöperates with the carriage feeding mechanism, which feeding mechanism in this form of tabulator constitutes the carriage release and check, or stop device, for tabulating purposes. Fig. 3 is a diagrammatic view of the tripping mechanism showing the normal position of each denominational element, and of the amplifier coöperating therewith. Fig. 4 is a similar view showing in full lines a denominational element and the amplifier arranged in set positions with the release lever moved to a position for releasing the carriage and showing in dotted lines the coöperating elements tripped to provide for checking or arresting the carriage by the relocking of the carriage feeding mechanism. Fig. 5 is a detail in perspective showing more plainly the operative relation between a denominational element, and the amplifier coöperating therewith. Fig. 6 is a detail in perspective of a form of column locating element that may be employed as a part of the tabulator shown in the group of Figs. 1 to 4, inclusive. Fig. 7 is a side view of the column locating element illustrating more plainly the form and position of the trip projection for operating the individual denominational elements when used alone. Fig. 8 is a sectional view on the line 8—8 of Fig. 1, showing more clearly the preferred type of carriage feeding or escapement mechanism which is utilized when the tabulator includes such mechanism as the check or stop for arresting the carriage at the proper point. Fig. 9 is a detail sectional view on the line 9—9 of Fig. 2, showing a preferable arrangement of the column arranging guide. Fig. 10 is a fragmentary view illustrating a modification of the construction shown in the other figures, wherein the spacing step or steps for the amplifier are carried by the shiftable spacer element of the latter, instead of by the column locating element as shown in Fig. 1. Fig. 11 is a diagrammatic sectional view illustrating the normal operative relation of a denominational element and an amplifier, modified as shown shown in Fig. 10. Fig. 12 is a detail in perspective of an amplifier constructed to carry its own spacing steps to provide for determining the spacing value, or denominational range, of any tabulating key or selector. Fig. 13 is a view similar to Fig. 10 showing another modification of the invention wherein the amplifier is illustrated as associated with an ordinary stop or impact type of tabulating mechanism. Fig. 14 is a detail sectional view on the line 14—14 of Fig. 13. Fig. 15 is a diagrammatic sectional view showing the normal operative relation of the amplifier to the stop elements of the mechanism shown in Fig. 13. Fig. 16 is a detail in perspective of the form of shiftable spacer element of an amplifier adapted for use in the relation shown in Figs. 13 and 15.

Like reference numerals designate corresponding parts throughout the several figures of the drawings.

In carrying out the invention, the means for arresting the carriage at a given distance from a column locating, or predetermined point, may be varied according to the character of typewriting machine with which the improvement may be associated, so it will be understood that the several drawings are illustrative of the various phases which the invention may assume in providing tabulating mechanisms of different construction, and yet embodying the distinctive thought of the present invention, namely, that of a denominational amplifier for amplifying the spacing value, or denominational range, of each tabulating key, selector, or denominational element, as the same is variously termed, and, hence giving to each denominational element what may be properly termed a plural spacing value in contradistinction to the ordinary tabulators wherein each denominational element represents only one space or spacing value in the column of matter.

The invention possesses marked utility on account of the small number of working parts which need be employed, and the compactness with which they may be arranged in connection with the typewriting machine. In this aspect, the invention has special utility in connection with book typewriting machines, and also with a tabulating mechanism of the trip type, wherein the carriage feed or escapement mechanism, may be utilized as the carriage release and carriage stop as contemplated by our other application aforesaid. Exemplifying this useful adaptation of the improvement, reference will first be made to the construction illustrated in the group of Figs. 1 to 9, inclusive. In this construction, as shown in the drawings, the numeral 1 designates the bottom plate of the traveling carriage of a book typewriting machine. This carriage usually includes a casing containing the printing mechanism, and is supported by travelers 2 running on the front and rear track rails 3 and 4 of the track frame. The carriage feeding mechanism, as shown, is carried as an entirety by the base or bottom plate 1 of the machine carriage, and includes an upright swinging dog lever 5 having a suitable pivotal support at its lower end, and carrying the usual dogs 6 and 7, adapted to be moved, in a lateral direction, into and out of engagement with the teeth of a star wheel 8 loosely mounted on the feed shaft 9. The wheel 8 is provided at one side with a clutch member or face 10, coöperating with a companion clutch member or face 11, carried by a slidable clutch sleeve 12 feathered on the shaft 9, which also has arranged thereon a clutch or pressure spring 13 exerting its tension in a direction for normally holding the clutch face 11 engaged with the clutch face 10. The clutch sleeve 12 is provided with a grooved collar portion 14 loosely engaged by the inner end 15 of the disengaging member, or release lever, 16 for the carriage feeding mechanism. This member or lever 16 has a fixed pivotal support, as at 17, and is provided at its outer end with a finger piece 18, exposed to the operator at one side of the carriage, whereby the carriage feeding or escapement mechanism may be controlled for releasing and braking purposes, independently of the tabulator parts if so desired.

The feed shaft 9 carries at one extremity a spacing pinion 19 meshing with a stationary rack 20 usually carried with the rear track rail 4. This completes the essential features of the carriage feeding mechanism, and to illustrate the dual function thereof, namely, as an escapement for letter and word spacing, and as a release and stop device for tabulating, there is shown in the drawings the key and type action connections coöperating therewith. As shown, the upright dog lever 5 has a rod connection 21 with a swinging yoke lever 22 carried by a motion transmitting element 23 supported by the base of the carriage, such lever 22 being engaged at the top by suitable connections 24, coöperating with the universal bar 25 of the type action. Against this universal bar operates the key lever 26 having a suitable operating connection 27 with the type bar 28, as plainly shown in Fig. 2 of the drawings.

In connection with the construction described, the tabulator adapted thereto essentially consists of the said carriage feeding mechanism, and a trip mechanism controllable through selectors or keys independent of the type action keys. This trip mechanism comprises an adjustable column locating element 29, and a series of tripping denominational releasing elements 30 coöperating with the release member or lever 16, of the carriage feeding mechanism. As well understood, one or more of the column locating elements 29 may be employed according to the number of columns to be printed upon a sheet or page, but for the sake of clearness only one of such elements is referred to herein. The said adjustable column locating element 29 may be constructed and mounted in any suitable manner, but in the construction shown it essentially consists of a collar or sleeve member of approximate U form in cross section and adapted to be placed astride of a holding bar 31 carried by the track frame in any suitable manner, said holding bar 31 being usually rigidly supported in substantial parallelism to the rear track rail 4, as plainly illustrated in the several figures of the drawings.

The bar 31 is of a length equaling the full travel of the carriage, and is usually provided in one face thereof with a series of locking notches, teeth, or ratchets 32 adapted to be engaged by an inwardly deflected catch tooth 33 bent in from the terminal of one side wall of the collar body, or otherwise suitably formed, to provide means for locking the column locating element against movement in an outward direction. This construction permits the said column locating element or collar to be adjusted to any position within the extent of the machine scales to provide for locating the column at any desired point.

According to the adaptation of the invention the column locating element 29 may form a fixed stop, or merely operate as an actuator for other elements of the mechanism. In the form of mechanism being described, the collar constituting the column locating element 29 is provided thereon, preferably at one side, with an inclined flange 34 constituting a trip-actuating bevel or cam adapted to be engaged by the tappet arm 35 pendent from the interfering, or rear end portion, of each of the individual denominational elements 30 controllable from the selectors or keys.

Ordinarily, the individual denominational elements controllable by the keys or selectors represent one space in the column of matter to be entered, and in numerical work, the individual denominational elements respectively represent the units, tens, hundreds, thousands, ten-thousands, hundred-thousands, millions, etc. spaces, and therefore the same elements must be multiplied to suit the range of the tabulating mechanism.

The present invention obviates the necessity of thus multiplying the individual key selected denominational elements, and only provides a sufficient number of these elements to represent the units, tens, and hundreds in each of the denominational groups. Also, an extra one of the denominational elements may be employed to provide a decimal or period space, but for the purpose of setting forth the exact action of the invention, the drawings are restricted to simply a group of three individual denominational tabulating elements 30, which respectively represent units, tens, and hundreds, and which through the medium of the amplifier hereinafter described may be adapted for action in any of the denominational groups, to tabulate for units, tens, or hundreds of thousands, of millions, of billions, and so on. Thus the term denominational groups has reference to the separate groups of denominational factors, viz. first denominational group being units, tens, and hundreds; the second denominational group being units of thousands, tens of thousands, and hundreds of thousands; the third denominational group being units of millions, tens of millions, and hundreds of millions, and so on.

Referring more particularly to the mounting of the individual denominational elements 30, it is understood that usually the same are arranged side by side at a letter space distance apart, but in the construction shown these elements may be mounted to provide for varying the spaced relation thereof through the medium of a stationary column arranging guide 36. This column arranging guide consists of a slotted plate or bar fastened to the under side of the base 1, and interchangeably receiving the pendent tappet arms of the denominational tabulating elements. Each of the said denominational tabulating or releasing elements 30 is arranged with its pendent tappet arm 35 projecting through a clearance opening or slot 37 in the base or bottom plate 1 of the carriage, and this tappet arm is usually of an elbow form with a horizontally disposed engaging finger $35^a$, slidably resting in the guide or bracket 36 and whose point is adapted to be moved in and out of the path of interference with reference to the trip actuating bevel or cam 34, of the column locating element 29. In addition to the pendent tappet arm 35 at the rear interfering end portion thereof, each of said denominational tabulating elements 30 is provided, preferably within the rear end corner thereof, with a supplemental trip shoulder 38 overlying the base or bottom plate 1 and adapted to be moved over and into interfering relation with respect to the denominational amplifier 39, to which particular reference will be presently made. Also, each of the denominational tabulating elements 30 is provided, at a point intermediate the ends thereof, with a trip catch 40 in the form of a shoulder or suitable projection normally lying at one side, and within the horizontal plane, of the release lever 16 of the carriage feeding mechanism, so that when the denominational element 30 is drawn forward, in a direction for setting, the catch 40 presses against the lever 16 in a direction for disengaging the clutch 11 from the star wheel 8, thereby releasing the carriage to permit the advance thereof under the impulse of its actuator. The same movement which accomplishes this result draws the engaging finger of the tappet arm 35 into a path of interference with the member 34 of the column locating stop. Thus, when the carriage reaches the point where the entry of the item is to commence the tappet arm of the selected denominational element will engage with, and ride upward upon, the trip actuating bevel or cam 34 with the result of raising the denominational element 30, and tripping the catch 40 thereof out of engagement with the release lever 16, whereby the clutch of the feeding mechanism is permitted to automatically become relocked with the star wheel, thus restoring the carriage feeding mechanism to a locked condition and serving to check or arrest further movement thereof until the writing commences. Also, each of the denominational tabulating elements 30 has its own controlling means in the form of a selector or key preferably operable at the keyboard of the machine. Any suitable selectors or keys may be associated with the denominational tabulating elements, such, for instance, as the simple arrangement shown in the drawings in which each element 30 is illustrated as having its forward end pivotally connected, as at 41, to the lower arm of a bell crank lever 42 having a suitable pivotal support at its angle, and whose upper arm has a pivotal connection, as at 43, to the lower end of the stem of a selecting key 44. The bell cranks for the several denominational elements 30, and the selecting keys 44 therefor may be mounted in any suitable manner, but preferably in connection with the flanged guiding bracket 45 projected from one corner of the carriage casing, and occupying a position at one end of the keyboard so that the selecting keys will practically constitute a part of the keyboard. Furthermore, there is associated with each of the key controlled levers 42 a suitably arranged resetting spring 46 serving to return the parts of the tabulator to normal inactive positions when released.

As already indicated, the present invention centers upon the employment of the denominational amplifier 39 which coöperates with each of the denominational tabulating elements 30 and also with the column locating element. In the particular adaptation of the invention, shown in Figs. 1 to 9, inclusive, the amplifier acts in the capacity of a supplemental or auxiliary tripping means for the denominational tabulating elements, and, in a broad aspect, constitutes an extra interference which is projected or thrust into the interval between the denominational or key selected element, and the column locating element.

The denominational amplifier will necessarily assume various phases according to the construction of the other parts of the tabulator, but in the particular construction being described the amplifier proper, designated by the reference number 39, essentially consists of an auxiliary shiftable spacer element in the form of a plate having a variable shift with reference to the path of interference with the column locating point, and also having a play or movement at one side (preferably beneath) of the small group of denominational tabulating elements 30. In this aspect of the invention, the shiftable spacer element or plate 39 constituting the amplifier proper is illustrated as having a slidable movement in two directions upon the carriage base or bottom 1, beneath the individual denominational elements 30, and is carried at one end of a suitably formed lever arm 47 extending forwardly over the base of the carriage, and having a pivotal connection at its front end, as at 47$^a$, to one arm of a main actuator 48 adapted to have a movement of variable amplitude under the actuation of a plurality of group selecting keys.

Ordinarily, a pair of group selecting keys, designated respectively by the reference numbers 49 and 50, is employed when the range of the tabulator extends to entries of hundreds of millions, but it will of course be understood that there may be other of said group selecting keys should it be desired to provide a tabulator for working into billions, etc. The number of group selecting keys for the amplifier does not change the number of main tabulating keys 44 which ordinarily represent units, tens and hundreds in any denominational group, but in all adaptations of the invention the group selecting keys must be so related to the main actuator 48 that each group selecting key will move the actuator 48 and hence the amplifier 39, a different distance. To provide for this, in the construction shown, the main actuator 48 is one arm of a bell crank lever having a pivotal support 51 upon a pivot fitted to the carriage base, and whose other arm is designated by the reference number 52 and has connected with the terminal thereof the laterally extending key stem 53 carrying at its outer end the key 49 having a movement inward toward the adjacent side of the carriage, and limited in such movement by said side. At the terminal of its arm 52 the bell crank actuator 48 is provided with an upstanding abutment lug 55 at one side of which is arranged the key lever 56 of greater length than the bell crank arm or lever 52, but having a pivotal support at one end upon the same pivot 51. The free end of the key lever 56 has projected laterally therefrom the offstanding key stem 57, to the outer end of which is mounted the group selecting key 50, which like the key 49 has a movement toward, and is limited by, the adjacent side of the carriage frame.

For illustrative purposes, it will be understood that the group selecting key 50 will designate the thousands denominational group and the key 49 will designate the millions denominational group, and by reason of the different lengths of the separate lever member 52 and 56 the main actuator 48 has a movement of greater or less extent according to which one of the group selecting keys is pressed inward against the limiting stop therefor.

The main actuator 48, and the group selecting keys associated therewith, are retracted to normal positions through the medium of a readjusting spring 58 having a fixed point of attachment at one end, as at 59, upon the carriage base or bottom 1, and extending at an angle from such connection to a point of connection 60 upon the lever arm 47 at a point intermediate the end of said arm. By arranging the re-adjusting spring 58 in the interval between the lever arm 47, and the adjacent side edge of the carriage, said spring performs the dual function of retracting the lever arm 47 forwardly to its normal at-rest position, and also laterally to a non-interfering position with reference to the individual denominational tabulating elements 30, and the column locating element 29.

The effective features of the denominational amplifier reside in the provision thereof with means for effecting a spacing to check the carriage for printing in the higher denominational groups, and for tripping the selected denominational tabulating element 30 when the checking point has been reached. In the construction which has just been detailed, this is accomplished by providing the spacer element or plate 39, constituting the amplifier proper, with a pendent spacer contact 61 in the form of a finger adapted to coöperate with the spacing step or steps 62 carried by the column locating element 29; also with an upstanding beveled checking detent, or trip actuator, 63, adapted to be moved under and against the supplemental trip shoulder 38 of the selected denominational element 30 drawn into play.

In the normal position of parts, the amplifier or spacer element 39 is drawn forward with its checking detent 63 out of operative relation to the supplemental trip shoulder 38 of all of the denominational elements 30, and is also held in a position with the spacer contact 61 out of the path of interference with the spacing steps 62 on the column locating element 29. At this point it will be observed that the spacing steps 62 are in the forms of studs or projections projected from the body of the column locating element 29, and arranged in what may be correctly termed stepped order, at a stated distance from each other, in order that the amplifier may come into play according as it is adjusted for operating in the thousands or millions denominational groups. In further explanation of the action of the denominational amplifier in its relation to the column locating element, and the individual denominational elements 30, it has been noted for clearness that the individual elements 30 represent respectively units, tens, and hundreds, and hence individually provide for tabulating numbers of one, two or three figures without the use of the amplifier. For instance, to provide for locating in the column a number with three figures, such as 100, the hundreds key 44 is depressed so as to draw the hundreds denominational element 30 into an interfering path with reference to the trip actuating bevel 34 of the column locating element so that the carriage, through the tripping action previously described, will be arrested three spaces in advance of the decimal or column point.

The entry of a number with one or two figures will be provided for by depressing the units or tens tabulating or selecting keys 44, but to provide for columnating numbers in the thousands or millions denominational groups, the amplifier must be brought into play to provide for locating units of thousands, tens of thousands, hundreds of thousands, or units of millions, tens of millions, or hundreds of millions, etc. as the case may be. For instance, to provide for columnating an entry of 10,000 the tens tabulating key is depressed to draw the tens denominational element 30 forward to an active position and at the same time release the carriage feeding mechanism. At the same time, conveniently with one of the fingers of the same hand which depresses the tens tabulating key 44, the thousands group selecting key 50 is moved inward, thereby thrusting the lever arm 47 and the amplifier element 39 thereof in a rearward direction so as to bring the spacer contact 61 of said element into the path of interference with reference to the spacing step 62 nearest the decimal point, and at the same time carrying the bevel checking or tripping detent 63 into the transverse plane of the supplemental trip shoulder 38 of the selected element 30. With the part thus positioned, the carriage moves forward, under the impulse of its actuator, until the spacer contact 61 comes into engagement with the aforesaid spacing step 62, and the continued drawing pressure of the carriage actuator causes the amplifier or spacer element 39 to move transversely beneath the individual denominational elements 30 so as to carry its checking or tripping detent 63 forcibly against the shoulder 38 of the selected element 30, with the consequence of causing the latter to automatically rise and trip out of engagement with the release lever 16, with the result of permitting the carriage feeding mechanism to become automatically relocked, and thus form a positive stop or check for arresting further advance of the carriage. This stopping or arresting of the carriage takes place at the proper distance in advance of the column locating point to provide the proper starting point for beginning the entry of the ten-thousand item in the column. If the item is in the hundred of thousands, the hundreds tabulating key 44 is operated in conjunction with the thousands group selecting key 50, and the same action as described takes place with the exception of stopping the carriage a sufficient number of spaces in advance of the column locating point to enter the item.

If the entry is for units of thousands, such as 1,000, the units tabulating key is operated in conjunction with the thousands group selecting key 50, but where the item to be entered amounts to units, tens, or hundreds of millions the proper one of the keys 44 is operated in conjunction with the millions group selecting key 49, which, on account of the shorter radius of the lever arm 52, provides a greater amplitude of movement for the main actuator 48, with the consequence of moving the amplifier or spacer element 39 a greater distance rearward to bring its spacer contact 61 in the path of interference with the spacing step 62 which is the greatest distance from the decimal or column point.

In connection with the movement of the spacer element or amplifier proper 39 it is to be observed that the base or bottom of the carriage may be formed with a clearance opening or slot 61ª of sufficient extent to accommodate the movement of the spacer contact 61 in both directions in which it operates.

An obvious modification of the invention is suggested in Figs. 10, 11 and 12 of the drawings, which modification simply involves reversing the coöperating members of the amplifier proper and of the column locating element, but preserving the same operative relation of such elements. Instead of having the stepped series of spacing steps upon the column locating element, the modification referred to contemplates providing the amplifier or spacer element, designated by the number 39ª in the modification, with a series of spacing steps 62ª arranged in stepped order and provided in any convenient manner, such as bending flanges of fingers from the body of the element or amplifier. The said spacer element or amplifier 39ª is otherwise of the same construction and operates in exactly the same manner as already described, but the spacing steps 62ª which are arranged in stepped order, or different transverse planes, are designed to coöperate with a single spacer contact 61ª, projected from the column locating element 29 and subserving the same function as the spacer contact 61 previously referred to. This modified construction simplifies the formation of the column locating element, and at the same time accomplishes all of the results herein before indicated.

The adaptations of the invention already described involve the association thereof with a mechanism which includes the carriage feeding mechanism as the stopping or checking medium, but as the denominational amplifier is susceptible to a wide range of application in connection with different kinds of typewriters, and different forms of tabulating mechanisms, the construction illustrated in Figs. 13 to 16, inclusive, is shown to illustrate the adaptability of the amplifier to a tabulating mechanism of the ordinary stop or impact type. In this phase, the amplifier still performs the function of an extra interference projected into the interval between a selected denominational element and a column locating point, and referring particularly to the suggested construction, shown in the figures of the drawings referred to, it is to be noted that the tabulator indicated therein essentially consists of a series of individual denominational elements 30ª of the slidable plunger type, and arranged side by side upon the carriage frame or base. These plunger denominational elements 30ª may be mounted in a suitable guide 65 provided therefor, and each has connected with its front end an actuating key connection 44ª subserving the same function, and maintaining the same relation as the key connections 44 described with the other modifications. The elements 30ª are arranged a letter space distance apart, and the rear impact points 66 thereof are disposed a letter space distance apart and are normally retracted out of the path of interference with a column locating stop 67, which may be in the form of a U shaped cuff adjustably engaged with the notched holding rack 68, corresponding in position and function to the holding bar 31 previously described. This construction represents a common type of tabulating mechanism of the stop or impact form, and the elements 30 are adapted to be individually projected into the path of the stop 67 so that the movement of the carriage will be arrested solely by the impact of the elements with the stop. In adapting the amplifier to a tabulating mechanism of this character, the amplifier necessarily acts in the capacity, not of an actuator, but as an extra stop which is interposed between the column locating stop 67 and the selected denominational element, according as the entry is to be in the thousands or millions denominational group. In this instance the manner of operating the amplifier is substantially the same as already described, but in point of construction it may be slightly modified.

Referring to the construction shown in Figs. 13 to 16, inclusive, the reference number 39$^b$ designates the spacer element or amplifier proper carried at the rear end of the lever arm 47. This spacer element or amplifier proper 39$^b$ is formed with a plurality of spacing steps 62$^b$ arranged in stepped order, or in different transverse planes, so as to be separately thrown into an interfering relation with reference to the column locating stop 67, which, in this instance, therefore acts in the capacity of the spacer contact corresponding in function to the spacer contacts 61 and 61$^a$ of the modifications previously described. At the side opposite the spacing steps 62$^b$, the element 39$^b$ may be formed with a stop arm 69 adapted to engage against the projected end 66 of the selected denominational element 30$^a$, when either of the spacing steps 62$^b$ are arrested by impact with the column locating stop 67. In the modification just referred to the same provision is made for effecting a variable shift of the amplifier or spacer element 39$^b$ according to the spacing step 62$^b$ to be brought into play.

While all of the forms of the invention herein described are illustrated as applied to the traveling carriage of book typewriting machines, it is obvious that it is equally as applicable to tabulating mechanisms applied to the ordinary commercial form of typewriters, and from the phases of the invention indicated other modifications will readily suggest themselves to those skilled in the art.

It will further be understood that changes in the form, proportion and minor details of construction may be resorted to without departing from the spirit of the invention or sacrificing any of the advantages thereof.

Having thus described the invention, what is claimed and desired to be secured by Letters-Patent, is:—

1. A tabulating mechanism embodying a carriage, denominational elements, a column locating element coöperating with each denominational element to effect a stoppage of the carriage, and means located on the carriage and coöperating with said column locating element and with each of said denominational elements to effect a stoppage of the carriage at variable distances from the column locating element.

2. A tabulating mechanism comprising a column locating element, a series of denominational elements, and a denominational amplifier coacting with the column locating and denominational elements and having a variable shift for amplifying the spacing value of each of the latter.

3. A tabulating mechanism comprising a column locating element, a plurality of key selected denominational elements, and a separately operable denominational amplifier interposed as an extra interference between the column locating element and the denominational elements and co-acting with both, said amplifier having a variable shift for determining the denominational group within which each denominational element is to operate.

4. A tabulating mechanism comprising a column locating element, a plurality of denominational elements, and a denominational amplifier having separate members respectively engaging the column locating element and the individual denominational elements, said amplifier also having a variable shift for amplifying the spacing value of each denominational element.

5. A tabulating mechanism comprising a column locating element, a plurality of key selected denominational elements, and an amplifying device including an element arranged to be projected as an extra interference between the column locating element and the selected denominational element, a spacer contact, and spacing steps coöperating with the latter to determine the operating position of the amplifying means for checking purposes.

6. A tabulating mechanism comprising a column locating element, a plurality of denominational elements, and an amplifying device coöperating with the column locating element and the selected denominational element and comprising a spacer element proper, a spacer contact, and spacing steps coöperating with said contact to determine the operating position of the spacer element for checking purposes.

7. A tabulating mechanism comprising a column locating element, a series of denominational elements, a denominational amplifier comprising means for amplifying the spacing value of each denominational element, and group-selecting keys embodying means for imparting to the amplifier a variable movement.

8. A tabulating mechanism comprising a column locating element, a series of denominational elements, and an amplifying device comprising a spacer element co-acting with the column locating and denominational elements, and a plurality of group selecting keys having an operative connection with the spacer element and each having a throw of different amplitude.

9. A tabulating mechanism comprising a column locating element, a series of denominational elements, and an amplifying device co-acting with said elements and comprising a spacer element, a main actuator for said element, and a plurality of group selecting keys of different throw coöperating with the said main actuator.

10. A tabulating mechanism comprising a column locating element, a series of denominational elements, and an amplifying device co-acting with said elements and comprising a shiftable spacer element, a main actuator for said spacer element, and a plurality of group selecting keys having a lever throw of different amplitude and operatively related to the said main actuator.

11. A tabulating mechanism comprising a column locating element, a series of denominational elements, and an amplifying device co-acting with the said elements and comprising a shiftable spacer element, a lever arm carrying the spacer element, a swinging main actuator connected with said lever arm, and group selecting keys of different throw bearing operative relation to said main actuator.

12. A tabulating mechanism comprising a column locating element, a series of denominational elements, and an amplifying device co-acting with said elements and comprising a shiftable spacer element, a lever arm carrying said spacer element, a bell crank lever having one arm connected with the said lever arm to constitute the main actuator and having a group selecting key connected with its other arm, said latter arm having an abutment projection, and a second group selecting key having a long lever arm mounted on the pivot of the bell crank and coöperating with the abutment projection thereof.

13. A tabulating mechanism comprising a column locating element, a series of denominational elements, and an amplifying device co-acting with said elements and comprising a shiftable spacer element, a main actuator having a pivotal support and operatively connected with the shiftable spacer element, and a plurality of group selecting keys having lever members of different lengths connected to a common pivotal point and operatively related to the main actuator to provide therefor a movement of variable amplitude.

14. A tabulating mechanism comprising a column locating element, a series of denomination elements, and a denominational amplifier having a movement into and out of the path of the column locating element, and in a direction toward and from the denominational elements.

15. A tabulating mechanism comprising a column locating element, a series of denominational elements, and a denominational amplifier having a variable movement into and out of the path of the column locating element and in a direction toward and from the denominational elements.

16. A tabulating mechanism comprising a column locating element, a series of denominational elements, a denominational amplifier co-acting with said elements and having a variable movement into the path of the column locating element, said amplifier also having a movement toward and from the denominational elements, in coöperation with the selected denominational element, and common means for returning the amplifier to a normal inactive position from its movement in both directions.

17. A tabulating mechanism comprising a column locating element, a series of denominational elements, a denominational amplifier comprising a shiftable spacer element having a movement into and out of the path of the column locating element and toward and from the selected denominational element, a lever arm carrying the spacer element, means for moving the spacer element into a path of interference with the column locating element, and a re-adjusting spring connected with the said lever arm and arranged in a position for retracting the spacer element to a normal inactive position from its movement in both directions.

18. A tabulating mechanism comprising a column locating element, a series of denominational elements, and a denominational amplifier embodying a shiftable spacer element co-acting with the column locating and denominational elements and having a variable shift in one direction for coöperation with the column locating element, and a transverse movement beneath the denominational elements for coöperation with the selected one of the latter.

19. In a tabulator for typewriting machines, the carriage feeding mechanism, a trip mechanism comprising key controlled means for releasing the feeding mechanism and then automatically restoring it to a locked condition at variable distances from a predetermined point to effect a stopping of the carriage by such reëngagement alone, and means for amplifying the spacing value of each key controlled element of said mechanism whereby each key controlled element is operable for checking the carriage at variable distances from the column point.

20. In a tabulator for typewriting machines, a carriage feeding mechanism, a trip mechanism comprising key controlled means for releasing the feeding mechanism and then automatically restoring it to a locked condition for checking purposes, and a separate denominational amplifier arranged to operate the trip mechanism and comprising means for amplifying the spacing value of each key controlled element thereof.

21. In a tabulator for typewriting machines, a carriage feeding mechanism, a trip mechanism having means controllable by selectors for restoring the feeding mechanism to locked condition for checking the carriage at a given distance from a predetermined point, and separate means for amplifying the spacing value of each key controlled element of said mechanism.

22. In a tabulator for typewriting machines, a carriage feeding mechanism, and a trip mechanism embodying a column locating element, a key controlled releasing element coöperating with both the feeding mechanism and said column locating element, and separate means for amplifying the spacing value of said releasing elements.

23. In a tabulator for typewriting machines, a carriage feeding mechanism, a trip mechanism embodying an adjustable column locating element, a key controlled releasing element coöperating with both the feeding mechanism and said column locating element, and a denominational amplifier coöperating with the column locating element and the releasing element, said amplifier comprising means for amplifying the spacing value of the releasing element.

24. In a tabulator for typewriting machines, a carriage feeding mechanism, and a trip mechanism embodying a column locating element, a key controlled releasing element operatively related to both the column locating element and the feeding mechanism and having a tripping connection with the latter, and a separately controlled amplifying device having an actuating engagement with the releasing element.

25. In a tabulator for typewriting machines, a carriage feeding mechanism, and a trip mechanism embodying a column locating element, a plurality of denominational releasing elements co-acting with both the column locating element and the feeding mechanism and having an operative tripping connection with the latter, and a separately controlled amplifying device having an actuating engagement with the selected denominational releasing element.

26. In a tabulator for typewriting machines, a carriage feeding mechanism, and a trip mechanism embodying a column locating element, and a plurality of releasing elements having individual selecting actuators, and co-acting with both the column locating element and the carriage feeding mechanism, said releasing elements having a tripping connection with the carriage feeding mechanism, and a separately controlled amplifying device adapted to have an actuating engagement with the selected releasing element.

27. In a tabulator for typewriting machines, a carriage feeding mechanism, a trip mechanism embodying a column locating element, and a key controlled releasing element normally out of operative relation to the column locating element and co-acting both with the latter and the said carriage feeding mechanism, said releasing element having a tripping connection with the carriage feeding mechanism, and a separately controlled, normally inactive, amplifying device adapted to have an actuating engagement with the selected releasing element.

28. In a tabulator for typewriting machines, a carriage feeding mechanism, and a trip mechanism embodying a column locating element, and a plurality of releasing elements arranged in spaced relation and each having an individual selecting actuator and a tappet member adapted to be moved in and out of interfering relation to the column locating element, all of said releasing elements also having an operative tripping connection with the feeding mechanism, and a separately controlled normally inactive amplifying device adapted to be adjusted to an interfering relation with reference to the column locating element and the selected releasing element.

29. In a tabulator for typewriting machines, a carriage feeding mechanism, a trip mechanism comprising a holding bar, a column locating element arranged for adjustment upon the bar and having an engaging portion, and a series of key controlled slidable releasing bars operatively related to the carriage feeding mechanism and having contacts adapted to be moved in and out of interfering relation with reference to the column locating element, and a separately controlled normally inactive amplifying device adapted to be projected into interfering relation to the column locating element and the selected releasing bar.

30. In a tabulator for typewriting machines, a carriage feeding mechanism embodying a clutch and a disengaging member for said clutch, and a trip mechanism for releasing and resetting the feeding mechanism, said trip mechanism including key controlled elements having a tripping engagement with said disengaging member of the clutch, and a separately controlled normally inactive amplifying device adapted to have an actuating engagement with the selective one of the key controlled elements of the trip mechanism.

31. In a tabulator for typewriting machines, a carriage feeding mechanism embodying a clutch and a disengaging member for the clutch in the form of a lever, and a trip mechanism, said trip mechanism comprising a column locating element and a plurality of longitudinally slidable and vertically movable releasing bars having individual selecting keys for actuating the same, and provided with a pendent member coöperating with the column locating element, and with a trip catch shoulder coöperating with said disengaging member of the clutch, and a separately controlled normally inactive amplifying device adapted to be projected into interfering relation to the column locating element and the selected releasing bar, said amplifying device being adapted to have an actuating engagement with the selected releasing bar.

32. In a tabulator for typewriting machines, a carriage feeding mechanism having a disengaging member, a trip mechanism having key controlled elements co-acting with said disengaging member, and a separately controlled normally inactive amplifying device adapted to have an actuating engagement with the selected key controlled element of the tripping mechanism.

33. In a tabulator for typewriting machines, a carriage feeding mechanism, and a trip mechanism comprising a holding bar, a column locating element arranged for adjustment upon the bar and having an engaging portion, and a plurality of spacing steps, a series of key controlled slidable releasing bars operatively related to the carriage feeding mechanism and having pendent contacts adapted to be moved in and out of interfering relation with reference to the said engaging portion of the column locating element, and a separately controlled amplifying device embodying a normally inactive shiftable spacer element having a spacer contact adapted to be projected into interfering relation with reference to the individual spacing steps, said spacer element also having a checking detent arranged to become engaged with the selected releasing bar.

In testimony whereof we affix our signatures in presence of two witnesses.

HARRY S. DUKES.
WILLIAM H. CLAYTON.

Witnesses:
J. G. DUNAWAY,
PALMER DONAHER.